(12) United States Patent
Kudo et al.

(10) Patent No.: US 10,378,116 B2
(45) Date of Patent: Aug. 13, 2019

(54) PHOTOELECTROCHEMICAL REACTION DEVICE

(71) Applicant: KABUSHIKI KAISHA TOSHIBA, Minato-ku (JP)

(72) Inventors: Yuki Kudo, Yokohama (JP); Satoshi Mikoshiba, Yamato (JP); Akihiko Ono, Kita (JP); Jun Tamura, Yokohama (JP); Eishi Tsutsumi, Kawasaki (JP); Ryota Kitagawa, Setagaya (JP); Chingchun Huang, Ota (JP); Yoshitsune Sugano, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 131 days.

(21) Appl. No.: 15/248,812

(22) Filed: Aug. 26, 2016

(65) Prior Publication Data

US 2016/0362798 A1 Dec. 15, 2016

Related U.S. Application Data (63) Continuation of application No. PCT/JP2015/000966, filed on Feb. 25, 2015.

(30) Foreign Application Priority Data

Mar. 24, 2014 (JP) .................. 2014-059593

(51) Int. Cl.
*C25B 1/10* (2006.01)
*C25B 9/08* (2006.01)
(Continued)

(52) U.S. Cl.
CPC ............... *C25B 1/003* (2013.01); *C25B 1/00* (2013.01); *C25B 1/10* (2013.01); *C25B 9/00* (2013.01);
(Continued)

(58) Field of Classification Search
CPC ....................................... C25B 1/003
(Continued)

(56) References Cited

U.S. PATENT DOCUMENTS 3,925,212 A * 12/1975 Tchernev ............... C25B 1/003
204/278
4,466,869 A * 8/1984 Ayers ..................... C25B 1/003
205/340

(Continued)

FOREIGN PATENT DOCUMENTS

CN           1137840        12/1996
DE       36 10277 A1        10/1986
(Continued)

OTHER PUBLICATIONS

Office Action dated Sep. 5, 2017 in Japanese Patent Application No. 2014-059593 (with English language translation).
(Continued)

*Primary Examiner* — Harry D Wilkins, III
(74) *Attorney, Agent, or Firm* — Oblon, McClelland, Maier & Neustadt, L.L.P.

(57) ABSTRACT

A photoelectrochemical reaction device of an embodiment includes: a first stack including a first electrode, a second electrode, and a photovoltaic layer provided therebetween; a second stack including a third electrode electrically connected to the first electrode, a fourth electrode electrically connected to the second electrode, and an ion migration layer provided therebetween; and an electrolytic solution tank storing a first electrolytic solution in which the third electrode is immersed and a second electrolytic solution in which the fourth electrode is immersed. One of the third and fourth electrodes causes an oxidation reaction, and the other of the third and fourth electrodes causes a reduction reaction.

(Continued)

The third and fourth electrodes have ion permeability. An area of the second stack is larger than that of the first stack.

11 Claims, 8 Drawing Sheets

(51) Int. Cl.
*C25B 1/00* (2006.01)
*C25B 9/00* (2006.01)

(52) U.S. Cl.
CPC .............. *C25B 9/08* (2013.01); *Y02E 60/366* (2013.01); *Y02E 70/10* (2013.01); *Y02P 20/135* (2015.11)

(58) Field of Classification Search
USPC .......................................... 204/248; 205/340
See application file for complete search history.

(56) References Cited

U.S. PATENT DOCUMENTS

| | | | | |
|---|---|---|---|---|
| 4,643,817 | A * | 2/1987 | Appleby | C25B 1/003 205/340 |
| 4,650,554 | A * | 3/1987 | Gordon | C25B 1/003 205/340 |
| 5,785,768 | A | 7/1998 | Nakata | |
| 6,198,037 | B1 * | 3/2001 | Nakata | C25B 1/003 136/246 |
| 2005/0178427 | A1 | 8/2005 | Kelly et al. | |
| 2005/0183962 | A1 | 8/2005 | Oakes | |
| 2005/0205128 | A1 * | 9/2005 | Deng | C25B 1/003 136/256 |
| 2005/0211290 | A1 * | 9/2005 | Deng | C25B 1/003 136/252 |
| 2006/0065302 | A1 * | 3/2006 | Gibson | C25B 1/04 136/291 |
| 2007/0119718 | A1 * | 5/2007 | Gibsonl | C25B 1/02 205/637 |
| 2007/0246370 | A1 * | 10/2007 | Dimroth | C25B 1/04 205/628 |
| 2008/0073205 | A1 | 3/2008 | Adiga et al. | |
| 2010/0133110 | A1 | 6/2010 | Nocera et al. | |
| 2011/0214996 | A1 | 9/2011 | Yoshida et al. | |
| 2013/0118912 | A1 | 5/2013 | Reece et al. | |
| 2015/0252482 | A1 * | 9/2015 | Ono | C25B 1/003 |

FOREIGN PATENT DOCUMENTS

| | | |
|---|---|---|
| EP | 0 736 912 A1 | 10/1996 |
| JP | 61-223190 | 10/1986 |
| JP | 8-125210 | 5/1996 |
| JP | 10-290017 | 10/1998 |
| JP | 2000-192275 | 7/2000 |
| JP | 2003-288955 | 10/2003 |
| JP | 2004-197167 | 7/2004 |
| JP | 2005-133174 | 5/2005 |
| JP | 2006-265697 | 10/2006 |
| JP | 2007-107085 | 4/2007 |
| JP | 2007-526948 A | 9/2007 |
| JP | 2011-94194 | 5/2011 |
| JP | 2011-116581 | 6/2011 |
| JP | 2012-36414 | 2/2012 |
| JP | 2012-107280 | 6/2012 |
| JP | 2012-112001 A | 6/2012 |
| JP | 2013-503257 | 1/2013 |
| WO | WO 96/13070 A1 | 5/1996 |
| WO | WO 2006/110613 A2 | 10/2006 |
| WO | WO 2012/066922 A1 | 5/2012 |

OTHER PUBLICATIONS

International Search Report dated May 19, 2015 in PCT/JP2015/000966 filed on Feb. 25, 2015 (with English translation).
Written Opinion dated May 19, 2015 in PCT/JP2015/000966 filed on Feb. 25, 2015.
Steven Y. Reece, et al.,"Wireless Solar Water Splitting Using Silicon-Based Semiconductors and Earth-Abundant Catalysts", Science, vol. 334, 2011, 4 pgs.
John Turner, "Oxygen Catalysis: The other half of the equation", Nature Materials, vol. 7, 2008, 2 pgs.
English translation of International Preliminary Report on Patentability and Written Opinion of the International Searching Authority dated Oct. 6, 2016 in PCT/JP2015/000966 filed Feb. 25, 2015.

* cited by examiner

PHOTOELECTROCHEMICAL REACTION DEVICE

CROSS-REFERENCE TO RELATED APPLICATIONS

This application is a continuation of prior International Application No. PCT/JP2015/000966 filed on Feb. 25, 2015, which is based upon and claims the benefit of priority from Japanese Patent Application No. 2014-059593 filed on Mar. 24, 2014; the entire contents of all of which are incorporated herein by reference.

TECHNICAL FIELD

Embodiments described herein generally relate to a photoelectrochemical reaction device.

BACKGROUND ART

In recent years, there has been concern about the depletion of fossil fuel such as petroleum and coal, and renewable energy that can be sustainably utilized is increasingly expected. As one of the renewable energies, a solar cell and heat power generation which use sunlight are under development. The solar cell has problems that it requires cost for storage batteries used when the generated power (electricity) is stored and a loss occurs at the time of the power storage. On the other hand, a technique of directly converting the sunlight to a chemical substance (chemical energy) such as hydrogen ($H_2$), carbon monoxide (CO), methanol ($CH_3OH$), or formic acid (HCOOH) instead of converting the sunlight to electricity has been drawing attention. Storing the chemical substance converted from the sunlight in a cylinder or a tank has advantages that it requires less cost for storing the energy and further the storage loss is smaller, as compared with storing electricity converted from the sunlight in the storage battery.

As a photoelectrochemical reaction device that electrochemically converts sunlight to a chemical substance, there has been known, for example, a two-electrode type device that includes an electrode having a reduction catalyst for reducing carbon dioxide ($CO_2$) and an electrode having an oxidation catalyst for oxidizing water ($H_2O$), and in which these electrodes are immersed in water in which $CO_2$ is dissolved. These electrodes are electrically connected to each other via an electric wire or the like. In the electrode having the oxidation catalyst, $H_2O$ is oxidized by light energy, whereby oxygen ($\frac{1}{2}O_2$) is obtained and a potential is obtained. In the electrode having the reduction catalyst, by obtaining the potential from the electrode in which the oxidation reaction is caused, $CO_2$ is reduced and formic acid (HCOOH) or the like is generated. In the two-electrode type device, since the reduction potential of $CO_2$ is obtained by the two-stage excitation, conversion efficiency from the sunlight to the chemical energy is very low, namely, about 0.04%.

A photoelectrochemical reaction device using a stack (silicon solar cell or the like) in which a pair of electrodes sandwich a photovoltaic layer is also under investigation. In the electrode on a light irradiated side, water ($2H_2O$) is oxidized by light energy, whereby oxygen ($O_2$) and hydrogen ions ($4H^+$) are obtained. In the opposite electrode, by using the hydrogen ions ($4H^+$) generated in the electrode on the light irradiated side and a potential (e) generated in the photovoltaic layer, hydrogen ($2H_2$) or the like is obtained as a chemical substance. Conversion efficiency from the sunlight to chemical energy in this case is about 2.5%, which is greatly lower than conversion efficiency to electric energy of the photovoltaic layer itself. One reason for this is that the potential is lost since a migration length of ions generated in the electrode on the light irradiated side to the opposite electrode is long.

DETAILED DESCRIPTION

According to one embodiment, there is provided a photoelectrochemical reaction device including: a first stack including a first electrode, a second electrode, and a photovoltaic layer provided between the first electrode and the second electrode; a second stack including a third electrode having ion permeability, a fourth electrode having ion permeability, and an ion migration layer provided between the third electrode and the fourth electrode; a first connecting member electrically connecting the first electrode and the third electrode; a second connecting member electrically connecting the second electrode and the fourth electrode; and an electrolytic solution tank storing a first electrolytic solution in which at least the third electrode is immersed and a second electrolytic solution in which at least the fourth electrode is immersed. One of the third and fourth electrodes causes an oxidation reaction, and the other of the third and fourth electrode causes a reduction reaction. An area of the second stack is larger than that of the first stack.

Hereinafter, photoelectrochemical reaction devices of embodiments will be described with reference to the drawings.

First Embodiment

Figure 1:
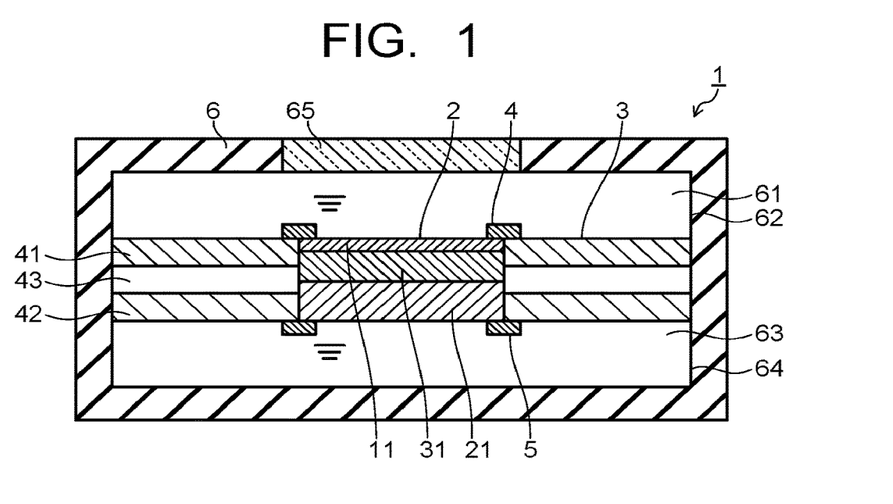
FIG. 1 is a cross-sectional view illustrating a photoelectrochemical reaction device according to a first embodiment.
Figure 2:
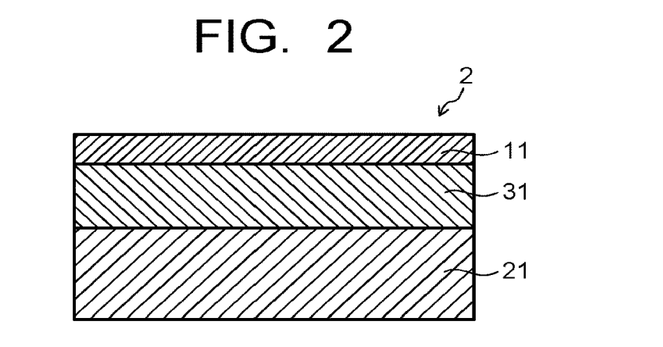
FIG. 2 is a cross-sectional view illustrating a first stack of the photoelectrochemical reaction device illustrated in FIG. 1.
Figure 3:
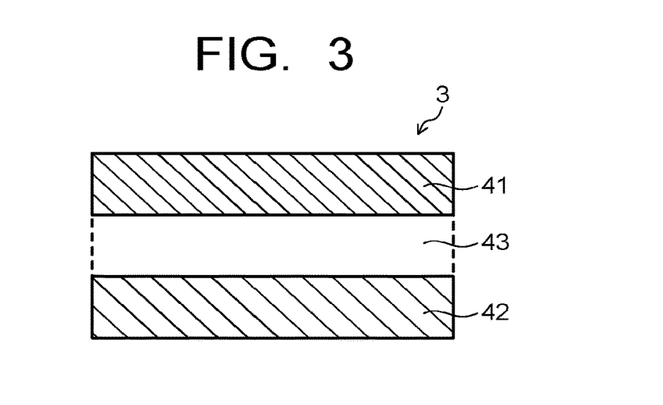
FIG. 3 is a cross-sectional view illustrating a second stack of the photoelectrochemical reaction device illustrated in FIG. 1.

FIG. 1 is a view illustrating a photoelectrochemical reaction device according to a first embodiment. FIG. 2 is a view illustrating a first stack in the photoelectrochemical reaction device illustrated in FIG. 1. FIG. 3 is a view illustrating a second stack in the photoelectrochemical reaction device illustrated in FIG. 1. The photoelectrochemical reaction device 1 according to the first embodiment includes a first stack 2, a second stack 3, a first connecting member 4, a second connecting member 5, and an electrolytic solution tank 6. As illustrated in FIG. 2, the first stack 2 includes a first electrode 11, a second electrode 21, and a photovoltaic layer 31 which is provided between these electrodes 11, 21, and performs charge separation by light energy.

As illustrated in FIG. 3, the second stack 3 includes a third electrode 41, a fourth electrode 42, and an ion migration layer 43 provided between these electrodes 41, 42. In the second stack 3, an oxidation reaction is caused in one of the third electrode 41 and the fourth electrode 42, and a reduction reaction is caused in the other of the third electrode 41 and the fourth electrode 42. The first electrode 11 and the third electrode 41 are electrically connected to each other by the first connecting member 4. The second electrode 21 and the third electrode 41 are electrically connected to each other by the second connecting member 5. The electrolytic solution tank 6 includes a first storage part 62 storing a first electrolytic solution 61 and a second storage part 64 storing a second electrolytic solution 63.

Figure 4:
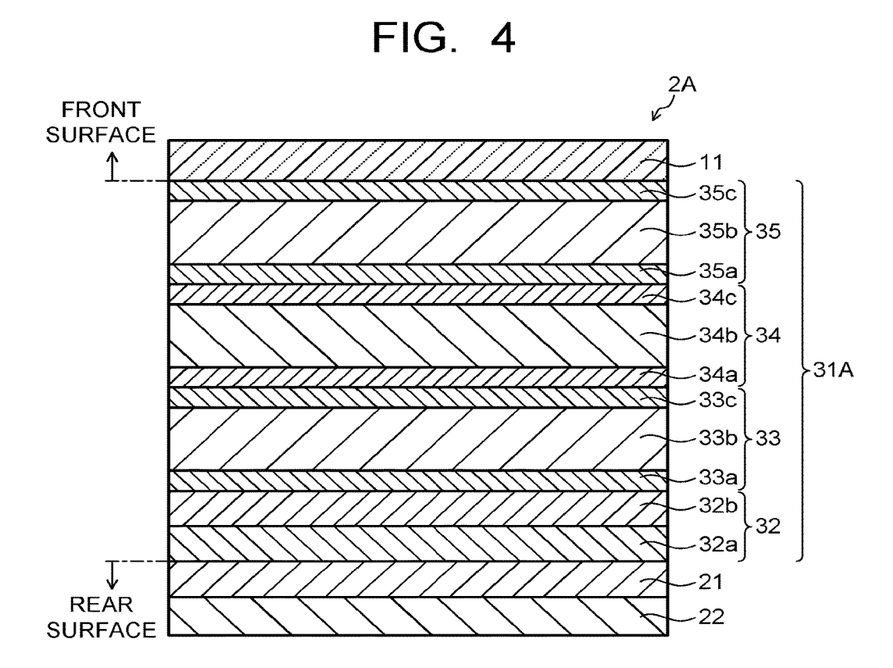
FIG. 4 is a cross-sectional view illustrating a first structural example of the first stack illustrated in FIG. 2.
Figure 5:
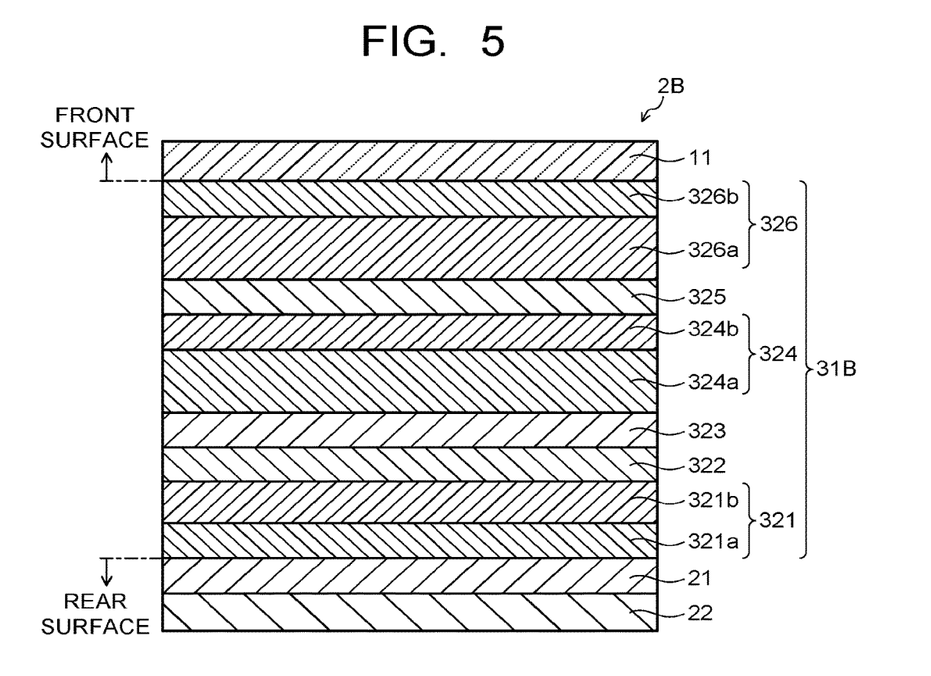
FIG. 5 is a cross-sectional view illustrating a second structural example of the first stack illustrated in FIG. 2.

The first stack 2 has a flat plate shape spreading in a first direction and a second direction perpendicular to the first direction. The first stack 2 is composed of, for example, the second electrode 21 as a substrate, and the photovoltaic layer 31 and the first electrode 11 which are formed in order on the second electrode 21. Here, a description will be given on assumption that a light irradiated side is a front surface (upper surface) and a side opposite the light irradiated side is a rear surface (lower surface). Structural examples of the first stack 2 will be described with reference to FIG. 4 and FIG. 5. FIG. 4 illustrates a photoelectrochemical cell (first stack) 2A which uses a silicon-based solar cell as a photovoltaic layer 31A, and FIG. 5 illustrates a photoelectrochemical cell (first stack) 2B which uses a compound semiconductor-based solar cell as a photovoltaic layer 31B.

In the first stack 2A illustrated in FIG. 4, a second electrode 21 has electrical conductivity. As a formation material of the second electrode 21, metal such as Cu, Al, Ti, Ni, Fe, or Ag, an alloy containing at least one of these metals, conductive resin, a semiconductor such as Si or Ge, or the like is used. The second electrode 21 is formed on a substrate 22, so that mechanical strength of the first stack 2A is maintained. The second electrode 21 itself may be used as a support substrate to enhance the mechanical strength of the first stack 2A. In such a case, as the second electrode 21, a metal plate, an alloy plate, a resin plate, a semiconductor substrate, or the like is used. The second electrode 21 may be made of an ion exchange membrane.

The photovoltaic layer 31A is formed on a front surface (upper surface) of the second electrode 21. The photovoltaic layer 31A is composed of a reflective layer 32, a first photovoltaic layer 33, a second photovoltaic layer 34, and a third photovoltaic layer 35. The reflective layer 32 is formed on the second electrode 21 and has a first reflective layer 32a and a second reflective layer 32b which are formed in order from a lower side. As the first reflective layer 32a, metal such as Ag, Au, Al, or Cu, an alloy containing at least one of these metals, or the like that has light reflectivity and electrical conductivity is used. The second reflective layer 32b is provided in order to adjust an optical distance to enhance light reflectivity. The second reflective layer 32b is joined to a later-described n-type semiconductor layer of the photovoltaic layer 31A and therefore is preferably formed of a material having a light transmittance property and capable of coming into ohmic contact with the n-type semiconductor layer. As the second reflective layer 32b, a transparent conductive oxide such as ITO (indium tin oxide), zinc oxide (ZnO), FTO (fluorine-doped tin oxide), AZO (aluminum-doped zinc oxide), or ATO (antimony-doped tin oxide) is used.

The first photovoltaic layer 33, the second photovoltaic layer 34, and the third photovoltaic layer 35 are each a solar cell using a pin junction semiconductor and their light absorption wavelengths are different. Stacking these in a planar manner makes it possible for the photovoltaic layer 31A to absorb lights with wide-ranging wavelengths of sunlight, which makes it possible to more efficiently utilize energy of the sunlight. Since the photovoltaic layers 33, 34, 35 are connected in series, it is possible to obtain a high open-circuit voltage.

The first photovoltaic layer 33 is formed on the reflective layer 32 and has an n-type amorphous silicon (a-Si) layer 33a, an intrinsic amorphous silicon germanium (a-SiGe) layer 33b, and a p-type microcrystalline silicon (me-Si) layer 33c. The a-SiGe layer 33b is a layer that absorbs light in a long wavelength range of about 700 nm. In the first photovoltaic layer 33, charge separation is caused by energy of the light in the long wavelength range.

The second photovoltaic layer 34 is formed on the first photovoltaic layer 33 and has an n-type a-Si layer 34a, an intrinsic a-SiGe layer 34b, and a p-type me-Si layer 34c which are formed in order from a lower side. The a-SiGe layer 34b is a layer that absorbs light in an intermediate wavelength range of about 600 nm. In the second photovoltaic layer 34, charge separation is caused by energy of the light in the intermediate wavelength range.

The third photovoltaic layer 35 is formed on the second photovoltaic layer 34 and has an n-type a-Si layer 35a, an intrinsic a-Si layer 35b, and a p-type me-Si layer 35c which are formed in order from a lower side. The a-Si layer 35b is a layer that absorbs light in a short wavelength range of about 400 nm. In the third photovoltaic layer 35, charge separation is caused by energy of the light in the short wavelength range. In the photovoltaic layer 31A, the charge separations are caused by the lights in the respective wavelength ranges. Specifically, holes are separated to a first electrode (anode) 11 side (front surface side) and electrons are separated to a second electrode (cathode) 21 side (rear surface side), so that an electromotive force is generated in the photovoltaic layer 31A.

The first electrode 11 is formed on the p-type semiconductor layer (p-type me-Si layer 35c) of the photovoltaic layer 31. The first electrode 11 is preferably formed of a material capable of coming into ohmic contact with the p-type semiconductor layer. As the first electrode 11, metal such as Ag, Au, Al, or Cu, an alloy containing at least one of these metals, a transparent conductive oxide such as ITO, ZnO, FTO, AZO, or ATO, or the like is used. The first electrode 11 may have, for example, a structure in which the metal and the transparent conductive oxide are stacked, a structure in which the metal and other conductive material are compounded, a structure in which the transparent conductive oxide and other conductive material are compounded, or the like.

In the first stack (the photoelectrochemical cell using the silicon-based solar cell) 2A illustrated in FIG. 4, the irradiating light passes through the first electrode 11 to reach the photovoltaic layer 31A. The first electrode 11 disposed on a light irradiated side (upper side in FIG. 4) has a light transmittance property for the irradiating light. The light transmittance property of the first electrode 11 is preferably 10% of an irradiation amount of the irradiating light or more, and more preferably 30% or more thereof. The first electrode 11 may have an aperture through which the light is transmitted. An open area ratio in this case is preferably 10% or more, and more preferably 30% or more.

In order to enhance electrical conductivity while maintaining the light transmittance property, a collector electrode made of metal such as Ag, Au, or Cu, an alloy containing at least one of these metals, or the like may be provided on at least part of the first electrode 11 on the light irradiated side. The collector electrode has a shape transmitting the light, and examples of its concrete shape are a liner shape, a lattice shape, a honeycomb shape, and so on. In order to maintain the light transmittance property, an area of the collector electrode is preferably 30% of an area of the first electrode 11 or less, and more preferably 10% or less thereof.

In FIG. 4, the photovoltaic layer 31A having the stacked structure of the three photovoltaic layers is described as an example, but the photovoltaic layer 31 is not limited to this. The photovoltaic layer 31 may have a stacked structure of two, or four or more photovoltaic layers. In place of the photovoltaic layer 31 having the stacked structure, the single photovoltaic layer 31 may be used. The photovoltaic layer 31 is not limited to the solar cell using the pin-junction semiconductor, but may be a solar cell using a pn-junction semiconductor. A semiconductor layer may be made of a compound semiconductor such as, for example, GaAs, GaInP, AlGaInP, CdTe, or CuInGaSe, not limited to Si or Ge. As the semiconductor layer, any of various forms such as monocrystalline, polycrystalline, and amorphous forms is applicable. The first electrode 11 and the second electrode 21 may be provided on the whole surfaces of the photovoltaic layer 31 or may be provided on part thereof.

Next, the first stack (the photoelectrochemical cell using the compound semiconductor based solar cell as the photovoltaic layer) 2B illustrated in FIG. 5 will be described. The first stack 2B illustrated in FIG. 5 is composed of a first electrode 11, a photovoltaic layer 31B, and a second electrode 21. The photovoltaic layer 31B in the first stack 2B is composed of a first photovoltaic layer 321, a buffer layer 322, a tunnel layer 323, a second photovoltaic layer 324, a tunnel layer 325, and a third photovoltaic layer 326.

The first photovoltaic layer 321 is formed on the second electrode 21 and has a p-type Ge layer 321*a* and an n-type Ge layer 321*b* which are formed in order from a lower side. On the first photovoltaic layer 321 (Ge layer 321*b*), the buffer layer 322 containing GaInAs and the tunnel layer 323 are formed for the purpose of lattice matching and electrical joining with GaInAs used in the second photovoltaic layer 324.

The second photovoltaic layer 324 is formed on the tunnel layer 323 and has a p-type GaInAs layer 324*a* and an n-type GaInAs layer 324*b* which are formed in order from a lower side. On the second photovoltaic layer 324 (GaInAs layer 324*b*), the tunnel layer 325 containing GaInP is formed for the purpose of lattice matching and electrical joining with GaInP used in the third photovoltaic layer 326. The third photovoltaic layer 326 is formed on the tunnel layer 325 and has a p-type GaInP layer 326*a* and an n-type GaInP layer 326*b* which are formed in order from a lower side.

The photovoltaic layer 31B in the first stack (the photoelectrochemical cell using the compound semiconductor-based solar cell as the photovoltaic layer) 2B illustrated in FIG. 5 is different in a stacking direction of the p-type and the n-type from the photovoltaic layer 31A in the first stack (the photoelectrochemical cell using the silicon semiconductor-based solar cell) 2A illustrated in FIG. 4, and therefore polarities of their electromotive forces are different. Specifically, when the charge separation is caused in the photovoltaic layer 31B by the irradiated light, electrons separate to a first electrode (cathode) 11 side (front surface side), and holes separate to a second electrode (anode) 21 side (rear surface side).

The second stack 3 is composed of a third electrode 41, a fourth electrode 42, and an ion migration layer 43 as illustrated in FIG. 1, FIG. 3, FIG. 6A, and FIG. 6B. The third electrode 41 is electrically connected to the first electrode 11 via a connecting electrode as the first connecting member 4. The fourth electrode 42 is electrically connected to the second electrode 21 via a connecting electrode as the second connecting member 5. The third and fourth electrodes 41, 42 are each formed of a material having electrical conductivity. As each of the third and fourth electrodes 41, 42, a metal plate of Cu, Al, Au, Ti, Ni, Fe, Co, Ag, or the like, an alloy plate containing at least one of these metals, a conductive resin plate, a semiconductor substrate of Si or Ge, or the like is used. Incidentally, in FIG. 1, the first stack 2 and the second stack 3 are depicted as being equal in thickness, but the both need not be equal in thickness, and the first stack 2 and the second stack 3 may be different in thickness, and the connecting electrodes 4, 5 may be different in thickness.

Figure 6A:
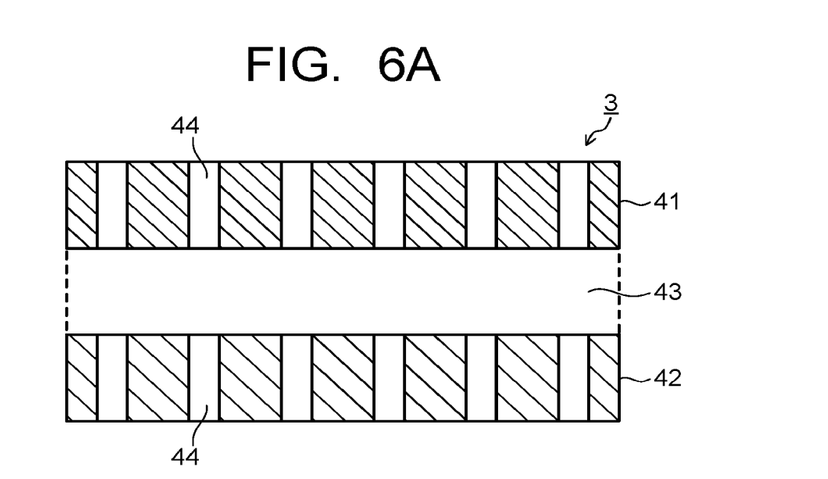
FIG. 6A is a cross-sectional view illustrating a structural example of the second stack illustrated in FIG. 1.

The third and fourth electrodes 41, 42 have ion permeability. The third and fourth electrodes 41, 42 have ion permeation holes 44 allowing ions to migrate therethrough while maintaining mechanical strength, as illustrated in FIG. 6A. An example of a shape of the ion permeation holes 44 is a fine pore illustrated in FIG. 6B. The fine pores as the ion permeation holes 44 only need to have a size large enough for the ions to migrate therethrough. For example, a lower limit value of a diameter (circle-equivalent diameter) of the fine pores is preferably 0.3 nm or more. The circle-equivalent diameter is defined as $((4 \times area)/\{pi\})^{1/2}$.

Figure 6B:
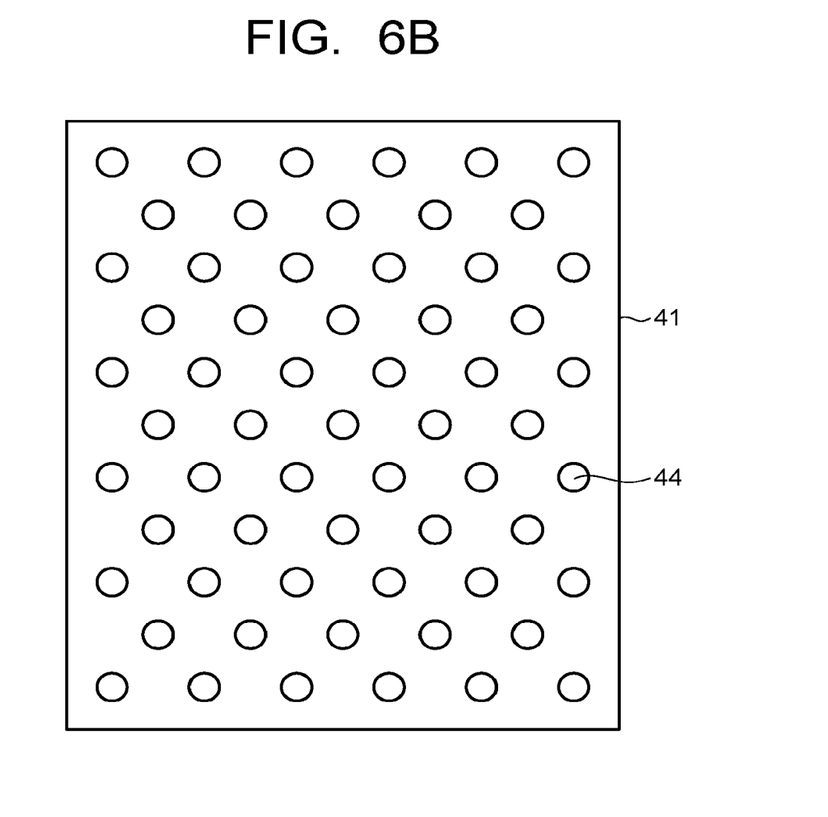
FIG. 6B is a plane view illustrating the structural example of the second stack illustrated in FIG. 1.

A shape of the fine pores is not limited to a circle and may be an ellipse, a triangle, a square, or the like. An arrangement structure of the fine pores is not limited to a square lattice arrangement, and may be a triangular lattice arrangement, a random arrangement, or the like. A shape of the ion permeation holes 44 is not limited to the fine pore, and may be a long hole, a slit, or the like. An ion exchange membrane may be filled in each of the ion permeation holes 44. Examples of the ion exchange membrane are cation exchange membranes such as Nafion and Flemion and anion exchange membranes such as Neosepta and Selemion. The ion permeation holes 44 may be filled with a glass filter or agar.

The ion migration layer 43 includes, for example, an ion exchange membrane, the first electrolytic solution 61, the second electrolytic solution 63, or the like. As the ion exchange membrane, a cation exchange membrane such as Nafion or Flemion or an anion exchange membrane such as Neosepta or Selemio is usable, for instance. The first electrolytic solution 61 or the second electrolytic solution 63 may be filled in a glass filter, agar, or the like to be used. Other materials can be applicable to the ion migration layer 43, provided that they are materials allowing the ions to migrate between the third electrode 41 and the fourth electrode 42.

In the second stack 3, the oxidation reaction is caused in one of the third electrode 41 and the fourth electrode 42, and the reduction reaction is caused in the other of the third electrode 41 and the fourth electrode 42. When the first stack (the photoelectrochemical cell using the silicon semiconductor-based solar cell as the photovoltaic layer) 2A illustrated in FIG. 4 is used, the holes separate to the first electrode 11 side (front surface side), and the electrons separate to the second electrode 21 side (rear surface side). Near the third electrode 41, the oxidation reaction is caused, and near the fourth electrode 42, the reduction reaction is caused. When the first stack (the photoelectrochemical cell using the compound semiconductor-based solar cell as the photovoltaic layer) 2B illustrated in FIG. 5 is used, the electrons separate to the first electrode 11 side (front surface side), and the holes separate to the second electrode 21 side (rear surface side). Near the fourth electrode 42, the oxidation reaction is caused, and near the third electrode 41, the reduction reaction is caused.

The electrolytic solution tank 6 includes the first storage part 62 storing the first electrolytic solution 61 in which the first electrode 11 and the third electrode 41 are immersed, and the second storage part 64 storing the second electrolytic solution 63 in which the second electrode 21 and the fourth electrode 42 are immersed. The electrolytic solution tank 6 is separated into two chambers by the first stack 2 and the second stack 3. In the first storage part 62 to which the first electrode 11 and the third electrode 41 are exposed, the first electrolytic solution 61 is stored. In the second electrolytic solution tank 64 to which the second electrode 21 and the fourth electrode 42 are exposed, the second electrolytic solution 63 is stored. The first and second electrolytic solutions 61, 63 are solutions containing $H_2O$, for instance.

In an upper surface of the electrolytic solution tank 6, a window part 65 made of a material high in light transmittance such as, for example, glass or acrylic resin is provided. The window part 65 is provided so that the light led to the inside of the electrolytic solution tank 6 is irradiated mainly to the first stack 2. By radiating the sunlight or the like from the window part 65 to the inside of the electrolytic solution tank 6, a photoelectromotive force is mainly generated in the first stack 2, and the reduction-oxidation reactions are caused mainly in the second stack 3. Consequently, it is possible to improve migration efficiency of the ions as will be described later while enhancing use efficiency of the light.

Out of the first and second electrolytic solutions 61, 63, one is a solution containing water ($H_2O$) and the other is a solution containing carbon dioxide ($CO_2$). In place of the solution containing $CO_2$, a solution containing $H_2O$ may be used. When the first stack 2A illustrated in FIG. 4 is employed, the solution containing $H_2O$ is used as the first electrolytic solution 61, and the solution containing $CO_2$ is used as the second electrolytic solution 63. When the first stack 2B illustrated in FIG. 5 is employed, the solution containing $CO_2$ is used as the first electrolytic solution 61, and the solution containing $H_2O$ is used as the second electrolytic solution 63.

As the solution containing $H_2O$, an aqueous solution containing an arbitrary electrolyte is usable. The solution containing $H_2O$ is preferably an aqueous solution that promotes the oxidation reaction of $H_2O$. Examples of the aqueous solution containing the electrolyte are aqueous solutions containing phosphoric acid ions ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), hydrogen carbonate ions ($HCO_3^-$), and so on.

The solution containing $CO_2$ is preferably a solution having a high $CO_2$ absorptance. Examples of the solution are aqueous solutions containing $LiHCO_3$, $NaHCO_3$, $KHCO_3$, $CsHCO_3$, and so on, as the solution containing $H_2O$. As the solution containing $CO_2$, alcohol such as methanol, ethanol, or acetone may be used. The solution containing $H_2O$ and the solution containing $CO_2$ may be the same solutions or different solutions. Since the solution containing $CO_2$ is preferably high in a $CO_2$ absorption amount, a different solution from the solution containing $H_2O$ is preferably used as the solution containing $CO_2$. The solution containing $CO_2$ is desirably an electrolytic solution that reduces a reduction potential of $CO_2$, has a high ion conductivity, and contains a $CO_2$ absorbent which absorbs $CO_2$.

Examples of the aforesaid electrolytic solution are an ionic liquid which is made of salts of cations such as imidazolium ions or pyridinium ions and anions such as $BF_4^-$ or $PF_6^-$ and which is in a liquid state in a wide temperature range, or its aqueous solution. Other examples of the electrolytic solution are amine solutions of ethanolamine, imidazole, or pyridine, or aqueous solutions thereof. Amine may be any of primary amine, secondary amine, and tertiary amine. Examples of the primary amine are methylamine, ethylamine, propylamine, butylamine, pentylamine, hexylamine, and the like. Hydrocarbons of the amine may be substituted by alcohol, halogen, or the like. Examples of the amine whose hydrocarbons are substituted are methanolamine, ethanolamine, chloromethyl amine, and so on. Further, an unsaturated bond may exist. These hydrocarbons are the same in the secondary amine and the tertiary amine. Examples of the secondary amine are dimethylamine, diethylamine, dipropylamine, dibutylamine, dipentylamine, dihexylamine, dimethanolamine, diethanolamine, dipropanolamine, so on. The substituted hydrocarbons may be different. This also applies to the tertiary amine. Examples in which the hydrocarbons are different are methylethylamine, methylpropylamine, and so on. Examples of the tertiary amine are trimethylamine, triethylamine, tripropylamine, tributylamine, trihexylamine, trimethanolamine, triethanolamine, tripropanolamine, tributanolamine, triexanolamine, methyldiethylamine, methyldipropylamine, and so on. Examples of the cations of the ionic liquid are 1-ethyl-3-methylimidazolium ions, 1-methyl-3-propylimidazolium ions, 1-butyl-3-methylimidazole ions, 1-methyl-3-pentylimidazolium ions, 1-hexyl-3-methylimidazolium ions, and so on. A second place of imidazolium ions may be substituted. Examples in which the second place of the imidazolium ions is substituted are 1-ethyl-2,3-dimethylimidazolium ions, 1-2-dimethyl-3-propylimidazolium ions, 1-butyl-2,3-dimethylimidazolium ions, 1,2-dimethyl-3-pentylimidazolium ions, 1-hexyl-2,3-dimethylimidazolium ions, and so on. Examples of pyridinium ions are methylpyridinium, ethylpyridinium, propylpyridinium, butylpyridinium, pentylpyridinium, hexylpyridinium, and so on. In both of the imidazolium ions and the pyridinium ions, an alkyl group may be substituted, or an unsaturated bond may exist. Examples of the anions are fluoride ions, chloride ions, bromide ions, iodide ions, $BF_4^-$, $PF_6^-$, $CF_3COO^-$, $CF_3SO_3^-$, $NO_3^-$, $SCN^-$, $(CF_3SO_2)_3C^-$, bis(trifluoromethoxysulfonyl)imide, bis(perfluoroethylsulfonyl)imide, and so on. Dipolar ions in which the cations and the anions of the ionic liquid are coupled by hydrocarbons may be used.

Next, an operation principle of the photoelectrochemical reaction device 1 of the first embodiment will be described with reference to FIG. 7. Here, the operation will be described, taking, as an example, the polarity when the first stack (the photoelectrochemical cell using the silicon semiconductor-based solar cell as the photovoltaic layer) 2A illustrated in FIG. 4 is used. A case where an absorbing liquid in which $CO_2$ is absorbed is used as the second electrolytic solution 63 in which the second electrode 21 and the fourth electrode 42 are immersed will be described. Incidentally, when the first stack (the photoelectrochemical cell using the compound semiconductor-based solar cell as the photovoltaic layer) 2B illustrated in FIG. 5 is used, the polarity is reversed and therefore, the absorbing liquid in which $CO_2$ is absorbed is used as the first electrolytic solution 61.

Figure 7:
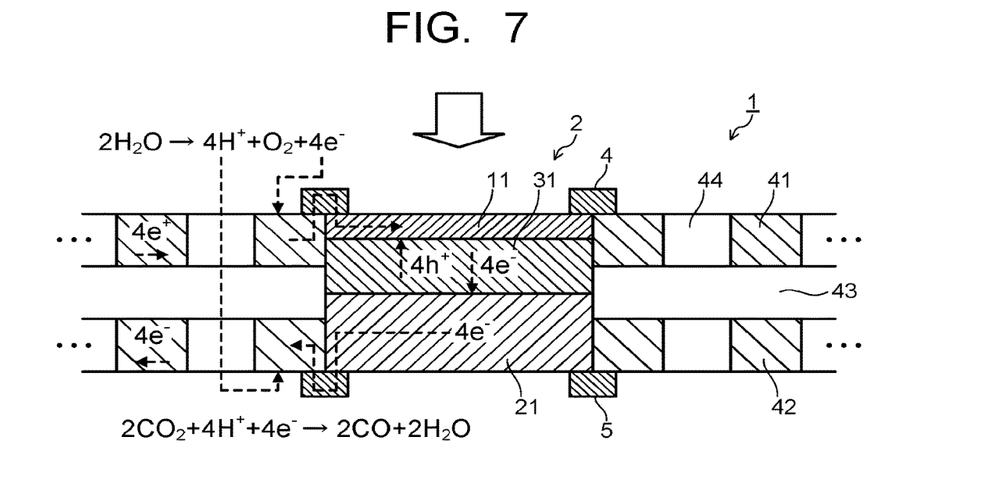
FIG. 7 is an explanatory view of an operation of the photoelectrochemical reaction device according to the first embodiment.

As illustrated in FIG. 1 and FIG. 7, when the light is irradiated from above the window part 65, the irradiating light passes through the first electrode 11 to reach the photovoltaic layer 31. When absorbing the light, the photovoltaic layer 31 generates electrons and holes which make pairs with the electrons, and separates them. Specifically, in the first photovoltaic layer 33, the second photovoltaic layer 34, and the third photovoltaic layer 35 which are included in the photovoltaic layer 31, the electrons migrate to the n-type semiconductor layer side (second electrode 21 side) due to a built-in potential, and the holes generated as the pairs with the electrons migrate to the p-type semiconductor layer side (first electrode 11 side). By such charge separation, the electromotive force is generated in the photovoltaic layer 31.

The holes generated in the photovoltaic layer 31 migrate to the first electrode 11. The holes bond with electrons which are generated by the oxidation reaction caused near the third electrode 41, via the connecting electrode 4 and the third electrode 41. The electrons which have migrated to the second electrode 21 are used in the reduction reaction caused near the fourth electrode 42, via the connecting electrode 5 and the fourth electrode 42. Concretely, near the third electrode 41 in contact with the first electrolytic solution 61, a reaction of the following formula (1) occurs. Near the second electrode 42 in contact with the second electrolytic solution 63, a reaction of the following formula (2) occurs.

$$2H_2O \rightarrow 4H^+ + O_2 + 4e^- \quad (1)$$

$$2CO_2 + 4H^+ + 4e^- \rightarrow 2CO + 2H_2O \quad (2)$$

Near the third electrode 41, $H_2O$ contained in the first electrolytic solution 61 is oxidized (loses electrons), so that $O_2$ and $H^+$ are generated, as expressed by the formula (1). $H^+$ generated in the third electrode 41 side migrates to the fourth electrode 42 side via the ion permeation holes 44 provided in the third electrode 41 and the ion migration layer 43. Near the fourth electrode 42, $CO_2$ contained in the second electrolytic solution 63 is reduced (obtains electrons) as expressed by the formula (2). Concretely, $CO_2$ contained in the second electrolytic solution 63, $H^+$ which has migrated to the fourth electrode 42 from the third electrode 41, and the electrons which have migrated to the fourth electrode 42 react with one another, so that CO and $H_2O$ are generated, for instance.

The photovoltaic layer 31 needs to have an open-circuit voltage equal to or larger than a potential difference between a standard oxidation-reduction potential of the oxidation reaction occurring near the third electrode 41 and a standard oxidation-reduction potential of the reduction reaction occurring near the fourth electrode 42. For example, the standard oxidation-reduction potential of the oxidation reaction in the formula (1) is 1.23 V, and the standard oxidation-reduction potential of the reduction reaction in the formula (2) is −0.1 V. Therefore, the open-circuit voltage of the photovoltaic layer 31 needs to be 1.33 V or more. The open-circuit voltage of the photovoltaic layer 31 is preferably equal to or more than the potential difference. Concretely, when the overvoltages of the oxidation reaction in the formula (1) and the reduction reaction in the formula (2) are both 0.2 V, the open-circuit voltage is desirably 1.73 V or more.

Near the fourth electrode 42, it is possible to cause not only the reduction reaction from $CO_2$ to CO expressed by the formula (2) but also a reduction reaction from $CO_2$ to formic acid (HCOOH), methane ($CH_4$), ethylene ($C_2H_4$), methanol ($CH_3OH$), ethanol ($C_2H_5OH$), or the like. It is also possible to cause the reduction reaction of $H_2O$ used in the second electrolytic solution 63 to generate $H_2$. By varying an amount of water ($H_2O$) in the second electrolytic solution 63, it is possible to change a generated reduced substance of $CO_2$. For example, it is possible to change a generation ratio of CO, HCCOH, $CH_4$, $C_2H_4$, $CH_3OH$, $C_2H_5OH$, $H_2$, and the like. Since the third electrode 41 and the fourth electrode 42 are each formed of the conductive material as described above, the electrons can migrate even to a position distant from the first stack 2, which makes it possible to favorably cause the oxidation reaction and the reduction reaction.

In the photoelectrochemical reaction device 1 of the first embodiment, only the ion migration layer 43 is interposed between the third electrode 41 in which the oxidation reaction occurs and the fourth electrode 42 in which the reduction reaction occurs, for instance. Since the third electrode 41 and the fourth electrode 42 are close to each other, it is possible to shorten a migration length of hydrogen ions ($H^+$) generated by the oxidation reaction near the third electrode 41. Therefore, it is possible to inhibit conversion efficiency from the sunlight to chemical energy from deteriorating due to a loss of the potential. That is, it is possible to obtain the conversion efficiency from the sunlight to the chemical energy comparable to conversion efficiency from the sunlight to electric energy of the photovoltaic layer 31 itself.

Figure 8:
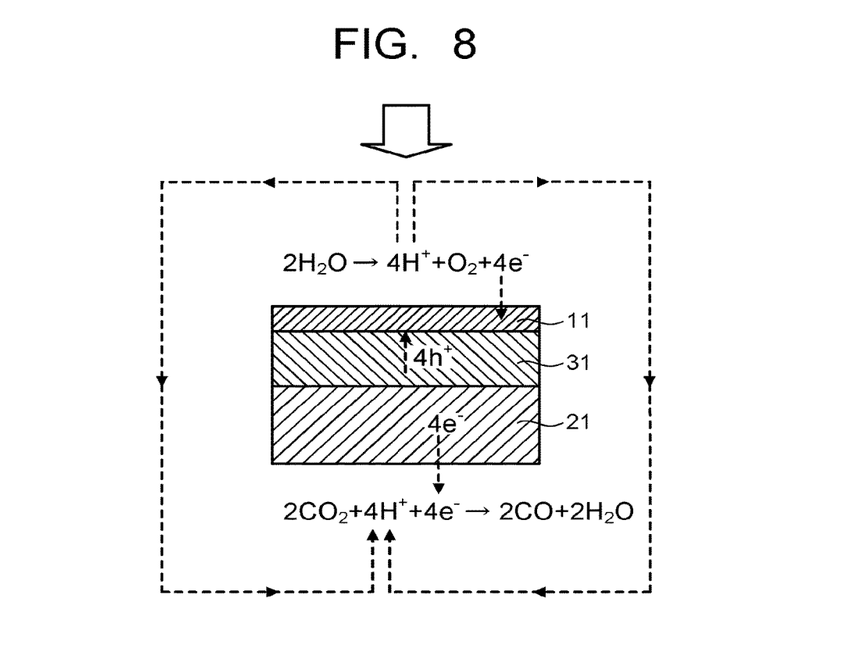
FIG. 8 is a view illustrating a photoelectrochemical reaction device as a comparative example.

For comparison with the embodiment, a structure of a photoelectrochemical cell when the second stack is not provided is illustrated in FIG. 8. As illustrated in FIG. 8, the holes generated in the photovoltaic layer 31 re-bond with the electrons generated by the oxidation reaction near the first electrode 11. The electrons which have migrated to the second electrode 21 are used for the reduction reaction near the second electrode 21. Near the first electrode 11, $H_2O$ is oxidized, so that $O_2$ and are generated as expressed in the formula (1). $H^+$ generated on the first electrode 11 side bypasses the cell to migrate to the second electrode 21 side due to ion diffusion (illustrated by the dotted lines in the drawing, and is used in the reduction of $CO_2$ as expressed in the formula (2).

The aforesaid ion diffusion has a limit, and a diffusion-limited current density is about 10 mA/cm², though depending on an electrolyte, temperature, and so on. Therefore, when a photocurrent generated in the photovoltaic layer 31 approximates the diffusion-limited current density, the ion migration is inhibited. Consequently, the conversion efficiency from the sunlight to the chemical energy is limited. The photocurrent when the sunlight of 1 SUN is irradiated is about 7 to 10 mA/cm² when the photovoltaic layer 31 is the three junction amorphous silicon-based one illustrated in FIG. 4, and is about 10 to 14 mA/cm² when the photovoltaic layer 31 is the three-junction gallium arsenide-based one illustrated in FIG. 5, and thus is approximate the diffusion-limited current density and corresponds to the condition under which the ion migration is limited.

Regarding this point, in the photoelectrochemical reaction device 1 illustrated in FIG. 1 to FIG. 7, the charges generated in the photovoltaic layer 31 migrate to the third electrode 41 and the fourth electrode 42 via the connecting electrodes 4, 5. When an area of the second stack 3 composed of the third electrode 41, the fourth electrode 42, and the ion migration layer 43 is made larger than an area of the first stack 2, a current density of the second stack 3 becomes smaller than the diffusion-limited current density. Therefore, the limitation by the diffusion can be avoided. As described above, the photocurrent of the three junction semiconductor is around 10 mA/cm$^2$, though depending on a material of the photovoltaic layer 31. Therefore, the area of the second stack 3 is preferably equal to or more than the area of the first stack 2, which makes it possible to inhibit the conversion efficiency from the sunlight to the chemical energy from deteriorating due to the limitation of the ion migration. The area of the second stack 3 is more preferably twice the area of the first stack 2 or more, and still more preferably four times or more.

The area of the first stack 2 is defined by an area of a region in which the charge separation can be caused. That is, let a stacking direction of the first stack 2 be a Z1 axis, and let directions perpendicular to the stacking direction be an X1 axis and a Y axis, the area of the first stack 2 is defined by its projected area when the first stack 2 is projected onto a plane P1 parallel to an X1-Y1 plane. The area of the second stack 3 is defined by an area of a region in which the reduction-oxidation reactions can be caused. That is, let a stacking direction of the second stack 2 be a Z2 axis and let directions perpendicular to the stacking direction be an X2 axis and a Y2 axis, the area of the second stack 3 is defined by its projected area when the second stack 3 is projected onto a plane P2 parallel to an X2-Y2 plane.

Second Embodiment

Figure 9:
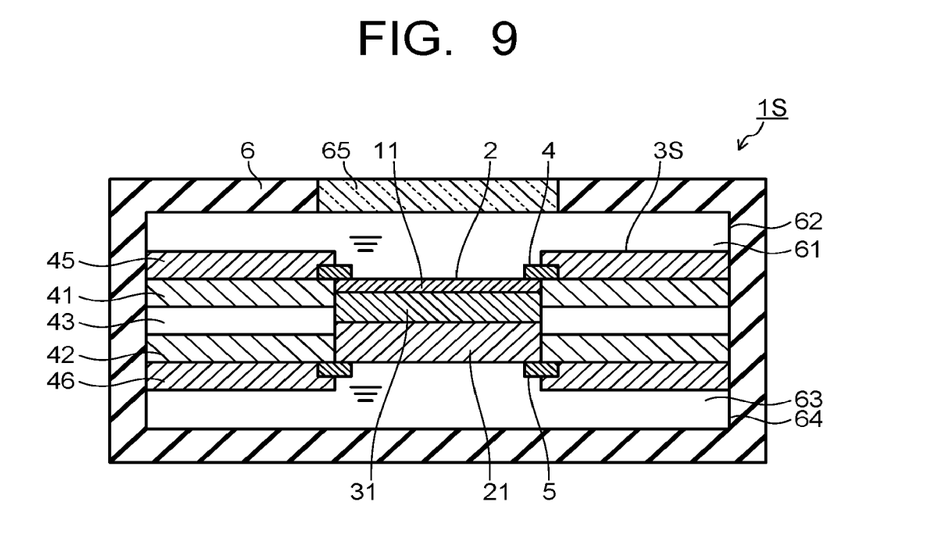
FIG. 9 is a cross-sectional view illustrating a photoelectrochemical reaction device according to a second embodiment.

A photoelectrochemical reaction device according to a second embodiment will be described with reference to FIG. 9 and FIG. 10. FIG. 9 is a view illustrating the photoelectrochemical reaction device of the second embodiment. In the second embodiment, the same parts as those of the first embodiment will be denoted by the same reference signs, and a description of part thereof will be sometimes omitted. The photoelectrochemical reaction device 1S illustrated in FIG. 9 has the same structure as that of the photoelectrochemical reaction device 1 of the first embodiment except in that a first catalyst layer 45 is formed on a third electrode 41 of a second stack 3S and a second catalyst layer 46 is formed on a fourth electrode 42 of the second stack 3S.

Figure 10:
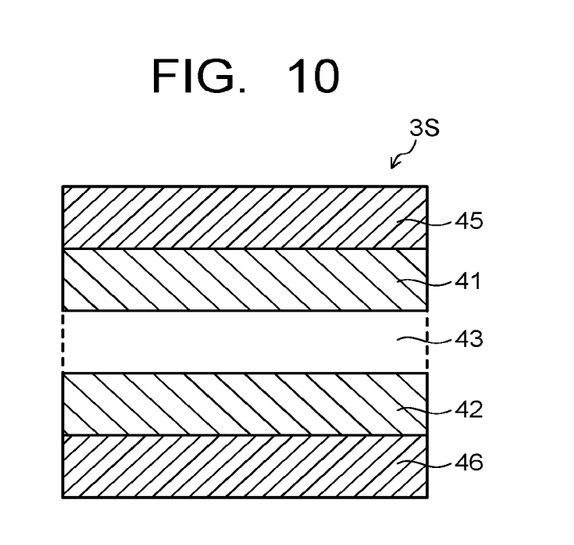
FIG. 10 is a cross-sectional view illustrating a second stack of the photoelectrochemical reaction device illustrated in FIG. 9.

In the photoelectrochemical reaction device 1S of the second embodiment, the second stack 3S is composed of the third electrode 41, an ion migration layer 43, the fourth electrode 42, the first catalyst layer 45 formed on the third electrode 41, and the second catalyst layer 46 formed on the fourth electrode 42, as illustrated in FIG. 10. The first catalyst layer 45 is provided in order to enhance chemical reactivity (reduction reactivity or oxidation reactivity) near the third electrode 41. The second catalyst layer 46 is provided in order to enhance chemical reactivity (oxidation reactivity or reduction reactivity) near the fourth electrode 42.

When the first stack (the photoelectrochemical cell using the silicon semiconductor-based solar cell as the photovoltaic layer) 2A illustrated in FIG. 4 is used, a catalyst which promotes an oxidation reaction is used as the first catalyst layer 45. Near the third electrode 41, $H_2O$ is oxidized, so that $O_2$ and are generated. The first catalyst layer 45 is made of a material which reduces activation energy for oxidizing $H_2O$. In other words, it is made of a material which lowers an overvoltage when $H_2O$ is oxidized to generate $O_2$ and $H^+$. Examples of such a material are binary metal oxides such as manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O), ternary metal oxides such as Ni—Co—O, Ni—Fe—O, La—Co—O, Ni—La—O, and Sr—Fe—O, quaternary metal oxides such as Pb—Ru—Ir—O and La—Sr—Co—O, or metal complexes such as a Ru complex and a Fe complex. A shape of the first catalyst layer 45 is not limited to a thin film shape, and may be an island shape, a lattice shape, a granular shape, or a wire shape.

When the first stack (the photoelectrochemical cell using the silicon semiconductor-based solar cell as the photovoltaic layer) 2A illustrated in FIG. 4 is used, a material which promotes a reduction reaction is used as the second catalyst layer 46. Near the fourth electrode 42, $CO_2$ is reduced, so that a carbon compound (for example, CO, HCOOH, $CH_4$, $CH_3OH$, $C_2H_5OH$, $C_2H_4$) or the like is generated. The second catalyst layer 46 is made of a material which reduces activation energy for reducing $CO_2$, in other words, a material which lowers an overvoltage when $CO_2$ is reduced to generate the carbon compound. Examples of such a material are metals such as Au, Ag, Cu, Pt, Pd, Ni, and Zn, an alloy containing at least one of these metals, carbon materials such as C, graphene, CNT (carbon nano tube), fullerene, and ketjen black, and metal complexes such as a Ru complex and a Re complex.

When a solution containing $H_2O$ is used as a second electrolytic solution 63, $H_2$ is sometimes generated by reducing $H_2O$. In this case, the second catalyst layer 46 is made of a material which reduces activation energy for reducing $H_2O$, in other words, a material which lowers an overvoltage when $H_2O$ is reduced to generate $H_2$. Examples of such a material are metals such as Ni, Fe, Pt, Ti, Au, Ag, Zn, Pd, Ga, Mn, and Cd, an alloy containing at least one of these metals, and carbon materials such as C, graphene, CNT, fullerene, and ketjen black. A shape of the second catalyst layer 46 is not limited to a thin film shape, and may be an island shape, a lattice shape, a granular shape, or a wire shape.

When the first stack (the photoelectrochemical cell using the compound semiconductor-based solar cell as the photovoltaic layer) 2B illustrated in FIG. 5 is used, polarity of an electromotive force and occurrence places of the oxidation and reduction reactions are opposite those in the first stack 2A illustrated in FIG. 4. The first catalyst layer 45 is made of the material which promotes the reduction reaction. The second catalyst layer 46 is made of the material which promotes the oxidation reaction. The material of the first catalyst layer 45 and the material of the second catalyst layer 46 are counterchanged as compared with the above-described case where the first stack 2A illustrated in FIG. 4 is used. Thus, the polarity of the photovoltaic layer 31 and the materials of the first catalyst layer 45 and the second catalyst layer 46 are arbitrary. The oxidation and reduction reactions by the first catalyst layer 45 and the second catalyst layer 46 are decided by the polarity of the photovoltaic layer 31, and the catalyst materials are selected according to the oxidation and reduction reactions.

As a formation method of the first catalyst layer 45 and the second catalyst layer 46, a thin-film forming method such as a sputtering method or a vapor deposition method, a coating method using a solution in which the catalyst material is dispersed, an electrodeposition method, a catalyst forming method by heat treatment or electrochemical treatment of the third electrode 41 or the fourth electrode 42 itself, or the like is usable. Only one of the first catalyst layer 45 and the second catalyst layer 46 may be formed.

According to the photoelectrochemical reaction device 1S of the second embodiment, by the first catalyst layer 45 formed on the third electrode 45 and the second catalyst layer 46 formed on the fourth electrode 42, it is possible to lower the overvoltages of the oxidation and reduction reactions owing to the oxidation and reduction reaction promoting effects of the catalysts, as compared with the first embodiment. Therefore, it is possible to more effectively utilize the electromotive force generated in the photovoltaic layer 31. According to the photoelectrochemical reaction device 1S of the second embodiment, it is possible to more enhance conversion efficiency from sunlight to chemical energy than the first embodiment.

Third Embodiment

Figure 11:
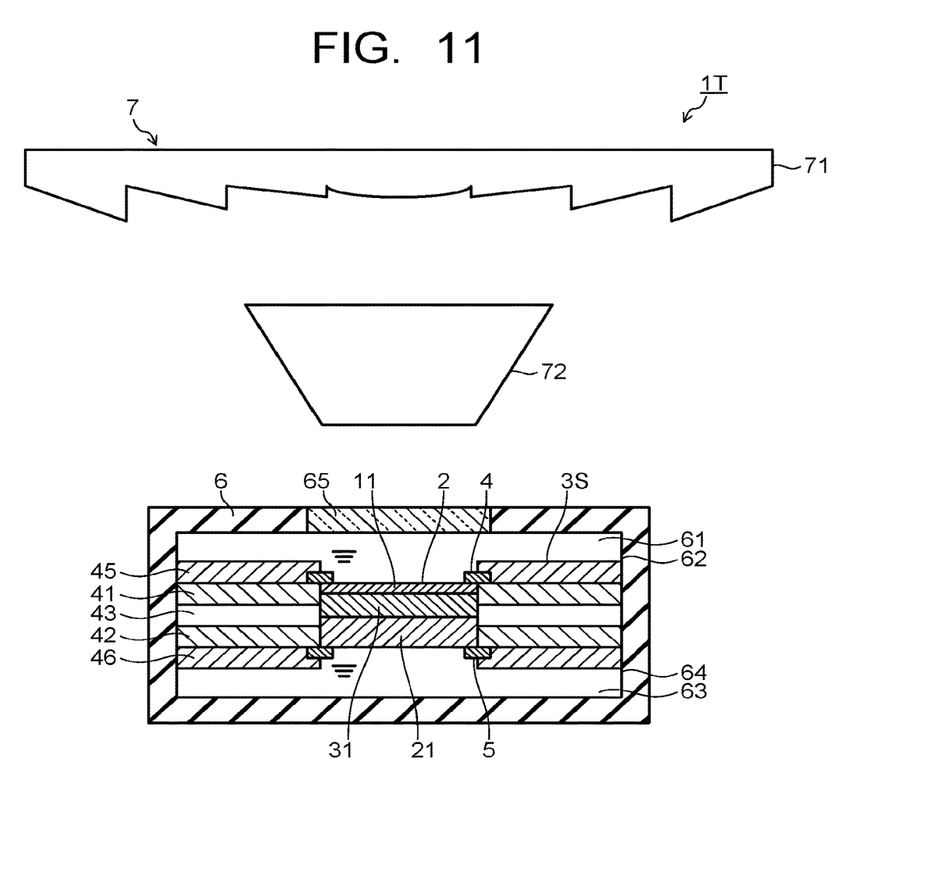
FIG. 11 is a cross-sectional view illustrating a photoelectrochemical reaction device according to a third embodiment.

A photoelectrochemical reaction device according to a third embodiment will be described with reference to FIG. 11. FIG. 11 is a view illustrating the photoelectrochemical reaction device of the third embodiment. In the third embodiment, the same parts as those of the first and second embodiments will be denoted by the same reference signs, and a description of part thereof will be sometimes omitted. The photoelectrochemical reaction device 1T illustrated in FIG. 11 has the same structure as that of the photoelectrochemical reaction device 1S of the second embodiment except in that it includes a lens 7 which condenses irradiating light such as sunlight to a window part 65 of an electrolytic solution tank 6.

The photoelectrochemical reaction device 1T of the third embodiment includes a first lens 71 which condenses the sunlight or the like and a second lens 72 which further condenses the light condensed by the first lens 71 and unifies in-plane distribution of light intensity on an irradiated surface. The first lens 71 is, for example, a Fresnel lens and has a shape made by arranging divided portions of the lens in a planar form. The second lens 72 is, for example, a rod lens. As a formation material of the first and second lenses 71, 72, glass or transparent resin such as acrylic or polycarbonate is usable.

The irradiating light such as the sunlight is condensed by the first lens 71 and the second lens 72 to be irradiated to a first stack 2. A second stack 3S is preferably disposed in a region other than a region irradiated with the condensed light, that is, in an unirradiated region not irradiated with the condensed light. A photocurrent I generated in the first stack 2 increases to A times a photocurrent $I_0$ obtained when the light is not condensed, where A is a light condensing magnification (light condensing ratio) by the first and second lenses 71, 72.

$$I=AI_0$$

A current of the second stack 3S due to ion diffusion is limited as previously described. In order to decrease an effective current density in the second stack 3S, an area of the second stack 3S is preferably equal to or more than an area of the first stack 2 multiplied by the light condensing magnification (multiplied by A). Consequently, it is possible to cause ions to migrate with a current density equal to or lower than a diffusion-limited current in the second stack 3S. The condensing increases a temperature of the first stack 2 as compared with a case without the condensing, but since the first stack 2 is immersed in a solution, heat of the first stack 2 is transferred quickly to the solution.

According to the photoelectrochemical reaction device 1T of the third embodiment, since the irradiating light is condensed to the first stack 2 by the first lens 71 and the second lens 72 and the second stack 3S is disposed in the region not irradiated with the irradiating light, it is possible to realize both an improvement of use efficiency of the light and an improvement of ion migration efficiency. Further, by setting the area of the second stack 3S equal to or larger than the area of the first stack 2 multiplied by the light condensing magnification (multiplied by A), it is possible to more effectively inhibit conversion efficiency from the sunlight to chemical energy from deteriorating due to the limitation of ion migration. Therefore, it is possible to further improve the conversion efficiency from the sunlight to the chemical energy.

Fourth Embodiment

Figure 12:
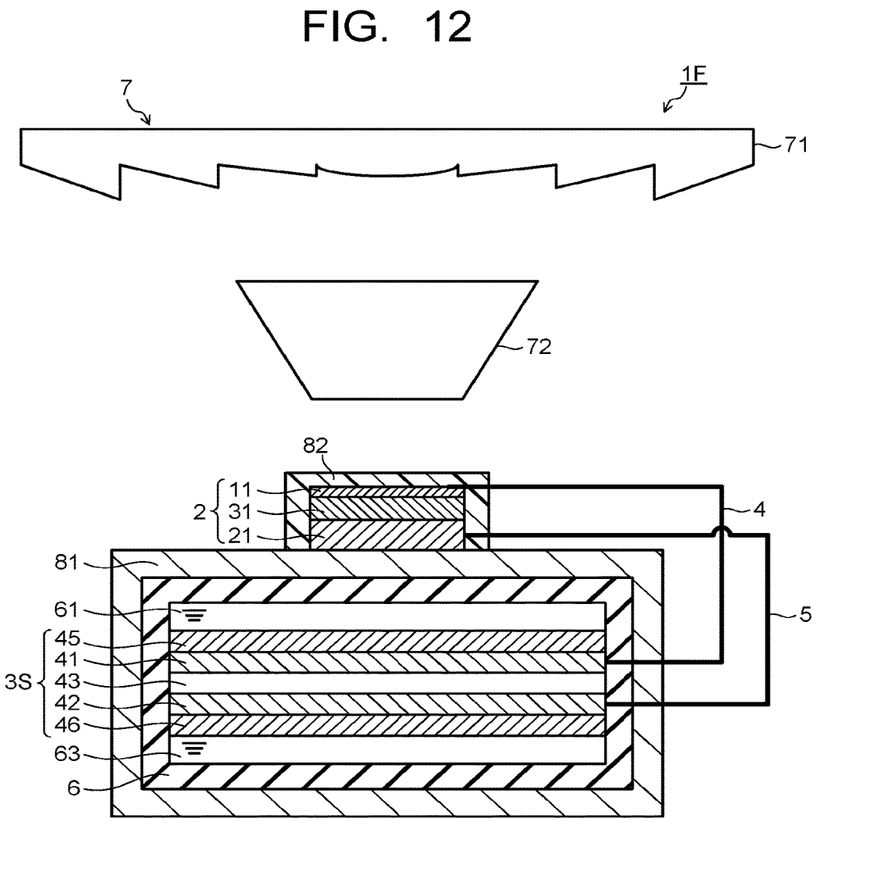
FIG. 12 is a cross-sectional view illustrating a photoelectrochemical reaction device according to a fourth embodiment.

A photoelectrochemical reaction device according to a fourth embodiment will be described with reference to FIG. 12. FIG. 12 is a view illustrating the photoelectrochemical reaction device of the fourth embodiment. In the fourth embodiment, the same parts as those of the first to third embodiments will be denoted by the same reference signs, and a description of part thereof will be sometimes omitted. The photoelectrochemical reaction device 1F illustrated in FIG. 12 has the same structure as that of the photoelectrochemical reaction device 1T of the third embodiment except in that a first stack 2 is disposed outside an electrolytic solution tank 6 and in structures that are accordingly required (wiring, an external structure of the first stack 2, and so on).

In the photoelectrochemical reaction device 1F of the fourth embodiment, the first stack 2 is disposed outside the electrolytic solution tank 6. The first stack 2 is in close contact with the electrolytic solution tank 6 via a heat conduction member 81, and further is covered by a protection sheet 82 except its portion in close contact with the electrolytic solution tank 6. A second stack 3S is disposed in the electrolytic solution tank 6. A first electrode 11 is electrically connected to a third electrode 41 via a first wiring line as a first connecting member 4. A second electrode 21 is electrically connected to a fourth electrode 42 via a second wiring line as a second connecting member 5. As each of the first and second wiring lines, a current cable with a low resistance made of Cu or a Cu alloy and covered by an insulating layer is preferably used. In order to transfer heat to a solution via the first and second wiring lines, the wiring lines are preferably in close contact with the electrolytic solution tank 6, and a wiring length is preferably as short as possible, though not illustrated.

As the heat conduction member 81, a material having a high heat conductivity and in addition having an electrical insulating property so as to electrically insulate the second electrode 21 and the electrolytic solution tank 6 from each other is preferably used. As the heat conduction member 81, it is preferable to use a heat transfer sheet made of a carbon fiber, a heat conductive grease or a heat conductive adhesive made of a silicone resin-based material, a heat conductive sheet made of an acrylic resin-based material, or the like. The protection sheet 82 is to protect the first stack 2 from water and so on. As the protection sheet 82, it is preferable to use a resin sheet made of fluorine-based resin, polyester resin, or the like (front sheet for solar cell, or the like).

In the photoelectrochemical reaction device 1T of the third embodiment previously described, the first stack 2 is liable to corrode by the solution because the first stack 2 is immersed in the solution. On the other hand, in the photoelectrochemical reaction device 1F of the fourth embodiment, since the first stack 2 is disposed outside the electrolytic solution tank 6 and is protected by the protection sheet 82, it is possible to prevent the corrosion of the first stack 2. However, a temperature of the first stack 2 is liable to increase due to condensing. Regarding this point, by making the first stack 2 in close contact with the electrolytic solution tank 6 via the heat conduction member 81, it is possible to suppress an excessive temperature increase of the first stack 2.

In the photoelectrochemical reaction device 1F of the fourth embodiment, as in the first and second embodiments, an area of the second stack 3S is equal to or larger than an area of the first stack 2. As in the third embodiment, when the condensing lens 7 is employed, the area of the second stack 3S is preferably equal to or larger than the area of the first stack 2 multiplied by the condensing magnification (multiplied by A). By these, it is possible to inhibit conversion efficiency from sunlight to chemical energy from deteriorating due to the limitation of ion migration in the second stack 3S. That is, according to the photoelectrochemical reaction device 1F of the fourth embodiment, it is possible to improve the conversion efficiency from the sunlight to the chemical energy.

Any combination of the structures of the first to fourth embodiments is applicable, or part thereof may be replaced. Here, certain embodiments have been described, but these embodiments have been presented by way of example only, and are not intended to limit the scope of the inventions. These embodiments may be embodied in a variety of other forms, and various omissions, substitutions and changes may be made without departing from the spirit of the inventions. These embodiments or modifications thereof are included in the scope and spirit of the inventions and included in the inventions described in the claims and their equivalents.

What is claimed is:

1. A photoelectrochemical reaction device, comprising:
   a first stack comprising a first electrode, a second electrode, and a photovoltaic layer provided between the first electrode and the second electrode;
   a second stack comprising a third electrode having ion permeability, a fourth electrode having ion permeability, and an ion migration layer provided between the third electrode and the fourth electrode, one of the third and fourth electrodes causing an oxidation reaction and the other of the third and fourth electrodes causing a reduction reaction;
   a first connecting member electrically connecting the first electrode and the third electrode;
   a second connecting member electrically connecting the second electrode and the fourth electrode; and
   an electrolytic solution tank including a first storage part to store a first electrolytic solution in which the first and third electrodes are immersed and a second storage part to store a second electrolytic solution in which the second and fourth electrodes are immersed,
   wherein an area of the second stack is larger than that of the first stack.

2. The device according to claim 1, wherein the area of the second stack is twice or more the area of the first stack.

3. The device according to claim 1, wherein each of the third and fourth electrodes has an ion permeation hole.

4. The device according to claim 1, wherein the ion migration layer has an ion exchange membrane, the first electrolytic solution, or the second electrolytic solution.

5. The device according to claim 1, wherein the second stack further comprises an oxidation catalyst layer provided on the one of the third and fourth electrodes and a reduction catalyst layer provided on the other of the third and fourth electrodes.

6. The device according to claim 1, wherein the electrolytic solution tank has a window part provided so as to allow the light to be irradiated mainly to the first stack.

7. The device according to claim 1, further comprising:
   a lens focusing light irradiated from an outside of the electrolytic solution tank to the first stack.

8. The device according to claim 7, wherein the area of the second stack is equal to or larger than the area of the first stack multiplied by a light focusing magnification of the lens.

9. The device according to claim 7, wherein the second stack is disposed in a region other than a region irradiated with the light focused by the lens.

10. The device according to claim 1, wherein the photovoltaic layer has at least one of a pin-junction semiconductor and a pn-junction semiconductor.

11. The device according to claim 1, wherein the one of the third and fourth electrodes oxidizes water to generate oxygen and hydrogen ions, and the other of the third and fourth electrodes reduces carbon dioxide to generate a carbon compound.

* * * * *